United States Patent
Liu et al.

(10) Patent No.: US 12,367,764 B2
(45) Date of Patent: Jul. 22, 2025

(54) OPTIMIZING TRAFFIC SIGNAL TIMING USING VEHICLE TELEMETRY DATA

(71) Applicants: GM Global Technology Operations LLC, Detroit, MI (US); Regents of the University of Michigan, Ann Arbor, MI (US)

(72) Inventors: Henry Xianghong Liu, Ann Arbor, MI (US); Xingmin Wang, Ann Arbor, MI (US); Zachary Jerome, Ann Arbor, MI (US); Vivek Vijaya Kumar, Shelby Township, MI (US); Fan Bai, Ann Arbor, MI (US); Zihao Wang, Ann Arbor, MI (US); Shengyin Shen, Ann Arbor, MI (US)

(73) Assignees: GM GLOBAL TECHNOLOGY OPERATIONS LLC, Detroit, MI (US); REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 244 days.

(21) Appl. No.: 18/308,996

(22) Filed: Apr. 28, 2023

(65) Prior Publication Data
US 2024/0363006 A1     Oct. 31, 2024

(51) Int. Cl.
G08G 1/081     (2006.01)
H04Q 9/00      (2006.01)

(52) U.S. Cl.
CPC .............. *G08G 1/081* (2013.01); *H04Q 9/00* (2013.01); *H04Q 2209/40* (2013.01)

(58) Field of Classification Search
CPC ....... G08G 1/081; H04Q 9/00; H04Q 2209/40
See application file for complete search history.

(56) References Cited

U.S. PATENT DOCUMENTS

| | | | |
|---|---|---|---|
| 8,705,527 B1 * | 4/2014 | Addepalli | H04W 72/20 370/389 |
| 10,497,259 B2 * | 12/2019 | Liu | G08G 1/0145 |
| 10,559,201 B1 * | 2/2020 | Bauer | G08G 1/0145 |
| 2024/0021076 A1 * | 1/2024 | Menard | G08G 1/0129 |
| 2024/0331535 A1 * | 10/2024 | Quirynen | G08G 1/081 |

\* cited by examiner

*Primary Examiner* — Curtis A Kuntz
*Assistant Examiner* — James E Munion
(74) *Attorney, Agent, or Firm* — Vivacqua Crane, PLLC

(57) ABSTRACT

A system for optimizing traffic signal timing using telemetry includes: wirelessly connected devices (WCDs), traffic operations centers (TOCs) controlling one or more traffic signals, and control modules storing and continuously executing control logic in a closed loop. The control logic continuously receives real-time WCD telemetry data and performs real-time processing of the telemetry data to match the telemetry data to physical locations. Processed telemetry data is aggregated to determine WCD trajectories. The system selectively performs time-of-day (TOD), offset, and green split optimizations, and receives the WCD trajectories and outputs of the TOD, offset, and green split optimization within an API. The system generates an optimized signal plan from data from the API, and verifies the optimized signal plan. The optimized signal plan is received by the TOCs and selectively uploaded to the traffic signals. The optimized signal plan increases throughput of traffic by decreasing total delays, and quantities of stops.

19 Claims, 3 Drawing Sheets

OPTIMIZING TRAFFIC SIGNAL TIMING USING VEHICLE TELEMETRY DATA

INTRODUCTION

Signalized intersections are indispensable parts of urban traffic networks. With tightening budgets and resources nowadays, maintaining efficient signal operation has become a challenging task for many traffic management agencies. Currently, many traffic control devices such as traffic signals in the U.S. are still fixed-time signals, which are not responsive to fluctuated traffic demands. For traffic signals to accommodate varying demands, vehicle detectors, e.g., inductance loop detectors or video detectors, need to be installed and maintained properly.

Recently, connected vehicle (CV) technology has received significant attention with active efforts of pilot deployments supported by the US Department of Transportation (USDOT). Most of the existing studies mainly focus on scenarios where penetration rates of CVs must be at a certain level, which may not be feasible.

Accordingly, while current systems and methods for optimizing traffic signal timing operate for their intended purpose, there is a need in the art for new and improved systems and methods for optimizing traffic signal timing that operate to allow traffic signals to prevent deadlock and gridlock situations without increasing complexity and without requiring standardization, while improving traffic signal functionality, intersection throughput and speed while maintaining or improving vehicle traffic flow.

SUMMARY

According to an aspect of the present disclosure, a system for optimizing traffic signal timing using telemetry data includes one or more wirelessly connected devices (WCDs), one or more traffic operations centers (TOCs) controlling one or more traffic signals, and one or more control modules. Each of the one or more control modules has a memory, a processor, and one or more input/output (I/O) ports. The memory stores programmatic control logic. The processor executes the programmatic control logic. The I/O ports are in communication with the one or more WCDs and the TOCs. The programmatic control logic operates continuously in a closed loop including at least, first, second, third, fourth, fifth, sixth, seventh, and eighth control logics. The first control logic continuously receives real-time raw telemetry data from the one or more WCDs. The second control logic performs real-time processing of the real-time raw telemetry data to match the real-time raw telemetry data to physical locations. The third control logic aggregates processed real-time raw telemetry data and determines trajectories of the WCDs. The fourth control logic selectively performs one or more of cycle and time-of-day (TOD), offset, and green split optimization microservices. The fifth control logic receives the trajectories of the WCDs and receives outputs of the cycle and TOD, offset, and green split optimization microservices within an API. The sixth control logic generates an optimized signal plan from the trajectories of the WCDs and outputs of the cycle and TOD, offset, and green split optimization microservices. The seventh control logic verifies the optimized signal plan. The eighth control logic receives the optimized signal plan within the one or more TOCs and selectively uploads the optimized signal plan to one or more traffic signals at signalized intersections. The optimized signal plan increases throughput of traffic at the signalized intersections from a first level to a second level greater than the first level by decreasing total delays and quantities of stops from a first quantity to a second quantity less than the first quantity. The system automatically generates new traffic signal timing plans. The traffic includes: all vehicles and devices at, approaching, or within the signalized intersections.

In another aspect of the present disclosure, the second control logic further includes control logic that matches the real-time raw telemetry data to map locations, control logic that splits individual WCD telemetry into movement-level trajectories for each WCD, and control logic that converts global navigation satellite system (GNSS) coordinates from the real-time raw telemetry data to distance measurements.

In yet another aspect of the present disclosure, the third control logic further includes control logic that aggregates map locations, movement-level trajectories, and distance measurements into an aggregated trajectory, and control logic that generates a traffic signal performance evaluation from directly measured real-time raw telemetry data and the aggregated trajectory.

In yet another aspect of the present disclosure, the control logic that generates a traffic signal performance evaluation further includes control logic that evaluates traffic signal performance from factors including: delay measurements, volume counts, arrival and departure times, split failure, and spill over for WCDs at the traffic signals.

In yet another aspect of the present disclosure, the fourth control logic further includes control logic that generates a cycle and TOD traffic signal timing plan that increases throughput by decreasing delays and quantities of stops for all devices from the first quantity to the second quantity less than the first quantity at the signalized intersection based on an overall traffic state of WCDs passing through the signalized intersection over time. The fourth control logic further includes control logic that generates an offset traffic signal timing plan that increases throughput of devices from the first level to the second level at the one or more traffic signals, and control logic that ascertains a green split time for each traffic signal in the system and optimizes green split timing for each of the traffic signals and increases throughput of all devices from the first level to the second level.

In yet another aspect of the present disclosure, the sixth control logic further includes control logic that continuously applies a probabilistic space-time model established by a queueing model that estimates and predicts a current traffic state and future traffic states based on depending on future traffic signal parameters. The WCDs make up only a portion of devices passing through the signalized intersections.

In yet another aspect of the present disclosure, the sixth control logic further includes control logic that determines an optimality gap. Upon determining that an optimality gap is present, the sixth control logic generates a signal phase and timing (SPaT) diagnosis including: traffic signal cycle and time of day issue recognition, green split issue recognition, and traffic signal coordination issue recognition, and generates the optimized signal plan based on the optimality gap. The sixth control logic further includes control logic that, upon determining that no optimality gap is present, does not generate the optimized signal plan.

In yet another aspect of the present disclosure, the seventh control logic further includes control logic that verifies the optimized signal plan by performing a safety and security check of the optimized signal plan. The safety and security check ensures that the optimized signal plan is received from a recognized and trusted source, that wireless signal quality degradation and packet loss have not degraded the optimized signal plan, and that the optimized signal plan satisfies defined safety constraints.

In yet another aspect of the present disclosure, the eighth control logic further includes control logic that receives the optimized signal plan within a TOC server and automatically uploads the optimized signal plan to a traffic signal controller. The traffic signal controller executes the optimized signal plan and causes one or more traffic signals to operate in accordance with traffic signal timing within the optimized signal plan.

In yet another aspect of the present disclosure, the eighth control logic further includes control logic for presenting a traffic engineer, within the TOC, with the optimized signal plan. The traffic engineer selectively inhibits the optimized signal plan from being uploaded to the traffic signal controller.

In yet another aspect of the present disclosure, a method for optimizing traffic signal timing using telemetry data includes utilizing one or more wirelessly connected devices (WCDs), controlling one or more traffic signals through one or more traffic operations centers (TOCs), and utilizing one or more control modules. Each of the one or more control modules has a memory, a processor, and one or more input/output (I/O) ports. The memory stores programmatic control logic. The processor executes the programmatic control logic, and the I/O ports are in communication with the one or more wirelessly connected devices and the TOCs. The programmatic control logic operates continuously in a closed loop including continuously receiving real-time raw telemetry data from the one or more WCDs, and performing real-time processing of the real-time raw telemetry data to match the real-time raw telemetry data to physical locations. The programmatic control logic further includes aggregating processed real-time raw telemetry data and determining trajectories of the WCDs, and selectively performing one or more of cycle and time-of-day (TOD), offset, and green split optimization microservices. The programmatic control logic further includes receiving the trajectories of the WCDs and for receiving outputs of the cycle and TOD, offset, and green split optimization microservices within an API, generating an optimized signal plan from the trajectories of the WCDs and outputs of the cycle and TOD, offset, and green split optimization microservices, and verifying the optimized signal plan. The programmatic control logic further includes receiving the optimized signal plan within the one or more TOCs and selectively uploading the optimized signal plan to one or more traffic signals. The optimized signal plan increases throughput of traffic at the signalized intersections from a first level to a second level greater than the first level by decreasing total delays and quantities of stops from a first quantity to a second quantity less than the first quantity. The system automatically generates new traffic signal timing plans.

In yet another aspect of the present disclosure, the method includes matching the real-time raw telemetry data to map locations, splitting individual WCD telemetry into movement-level trajectories for each WCD, and converting global navigation satellite system (GNSS) coordinates from the real-time raw telemetry data to distance measurements.

In yet another aspect of the present disclosure, the method includes aggregating map locations, movement-level trajectories, and distance measurements into an aggregated trajectory, and generating a traffic signal performance evaluation from directly measured real-time raw telemetry data and the aggregated trajectory.

In yet another aspect of the present disclosure, generating a traffic signal performance evaluation further includes evaluating traffic signal performance from factors comprising: delay measurements, volume counts, arrival and departure times, split failure, and spill over for WCDs at the traffic signal.

In yet another aspect of the present disclosure, generating a cycle and TOD traffic signal timing plan that increases throughput by decreasing delays and quantities of stops for all devices from the first quantity to the second quantity less than the first quantity at the signalized intersection based on an overall traffic state of WCDs passing through the signalized intersection over time, generating an offset traffic signal timing plan that increases throughput of devices from the first level to the second level at the one or more traffic signals, and ascertaining a green split time for each traffic signal in the system and optimizes green split timing for each of the traffic signals and increases throughput of all devices from the first level to the second level.

In yet another aspect of the present disclosure, the method further includes continuously applying a probabilistic space-time model established by a queueing model that estimates and predicts a current traffic state and future traffic states based on depending on future traffic signal parameters. The WCDs make up only a portion of devices passing through the signalized intersections. The method further includes determining an optimality gap. Upon determining that an optimality gap is present, the method generates a signal phase and timing (SPaT) diagnosis including: traffic signal cycle and time of day issue recognition, green split issue recognition, and traffic signal coordination issue recognition, and generates the optimized signal plan based on the optimality gap. Upon determining that no optimality gap is present, the method does not generate the optimized signal plan.

In yet another aspect of the present disclosure, the method further includes verifying the optimized signal plan by performing a safety and security check of the optimized signal plan. The safety and security check ensures that the optimized signal plan is received from a recognized and trusted source, that wireless signal quality degradation and packet loss have not degraded the optimized signal plan, and that the optimized signal plan satisfies defined safety constraints.

In yet another aspect of the present disclosure, the method further includes receiving the optimized signal plan within a TOC server, and automatically uploading the optimized signal plan to a traffic signal controller. The traffic signal controller executes the optimized signal plan and causes one or more traffic signals to operate in accordance with traffic signal timing within the optimized signal plan.

In yet another aspect of the present disclosure, the method further includes presenting a traffic engineer, within the TOC, with the optimized signal plan, and selectively inhibiting, via the traffic engineer, the optimized signal plan from being uploaded to the traffic signal controller.

In yet another aspect of the present disclosure, a method for optimizing traffic signal timing using telemetry data includes utilizing one or more wirelessly connected devices (WCDs), controlling one or more traffic signals through one or more traffic operations centers (TOCs), and utilizing one or more control modules. Each of the one or more control modules having a memory, a processor, and one or more input/output (I/O) ports. The memory stores programmatic control logic. The processor executes the programmatic control logic, and the I/O ports are in communication with the one or more WCDs and the TOCs. The programmatic control logic operates continuously in a closed loop including continuously receiving real-time raw telemetry data from the one or more WCDs, and performing real-time processing of the real-time raw telemetry data by matching the real-time raw telemetry data to map real-time raw telemetry data to physical locations. The programmatic control logic further includes splitting individual WCD telemetry into movement-level trajectories for each WCD, and converting global navigation satellite system (GNSS) coordinates from the real-time raw telemetry data to distance measurements. The programmatic control logic further includes aggregating map locations, movement-level trajectories, and distance measurements into an aggregated trajectory. The programmatic control logic further includes generating a traffic signal performance evaluation from directly measured real-time raw telemetry data and the aggregated trajectory, and evaluating traffic signal performance from factors including: delay measurements, volume counts, arrival and departure times, split failure, and spill over for WCDs at the traffic signal. The programmatic control logic further includes selectively performing one or more of cycle and time-of-day (TOD), offset, and green split optimization microservices by generating a cycle and TOD traffic signal timing plan that increases throughput of WCDs from a first level to a second level greater than the first level at a signalized intersection based on a volume of WCDs passing through the signalized intersection over time. The programmatic control logic further includes generating a cycle and TOD traffic signal timing plan that increases throughput by decreasing delays and quantities of stops for all devices from the first quantity to the second quantity less than the first quantity at the signalized intersection based on an overall traffic state of WCDs passing through the signalized intersection over time. The programmatic control logic further includes generating an offset traffic signal timing plan that increases throughput of devices from the first level to the second level at the one or more traffic signals, and ascertaining a green split time for each traffic signal in the system and optimizes green split timing for each of the traffic signals and increasing throughput of WCDs from the first level to the second level. The programmatic control logic further includes continuously applying a probabilistic space-time model calibration and estimation, and predicting an overall average traffic state. The WCDs make up only a portion of devices passing through an intersection. The programmatic control logic further includes receiving the trajectories of the WCDs, and receiving outputs of the cycle and TOD, offset, and green split optimization microservices within an API. The programmatic control logic further includes generating an optimized signal plan from the trajectories of the WCDs and outputs of the cycle and TOD, offset, and green split optimization microservices, and determining an optimality gap. Upon determining that an optimality gap is present, the programmatic control logic generates a signal phase and timing (SPaT) diagnosis including: traffic signal cycle and time of day issue recognition, green split issue recognition, and traffic signal coordination issue recognition, and generating the optimized signal plan based on the optimality gap. The programmatic control logic verifies the optimized signal plan by performing a safety and security check of the optimized signal plan. The safety and security check ensures that the optimized signal plan is received from a recognized and trusted source. The programmatic control logic receives the optimized signal plan within a TOC server, and presents a traffic engineer, within the TOC, with the optimized signal plan. Upon receiving confirmation from the traffic engineer, the programmatic control logic selectively uploads the optimized signal plan to a traffic signal controller. The traffic signal controller executes the optimized signal plan and causes one or more traffic signals to operate in accordance with traffic signal timing within the optimized signal plan. The optimized signal plan increases throughput of traffic at the signalized intersections from a first level to a second level greater than the first level by decreasing total delays and quantities of stops from a first quantity to a second quantity less than the first quantity. The method automatically generates new traffic signal timing plans.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses. As used herein, the term "minimize" and conjugations thereof (e.g., minimization, minimized, minimizes, etc.) means the continuous and/or iterative reduction from a first level to a second level less than the first level. Similarly, the term, "maximize" and conjugations thereof (e.g., maximization, maximized, maximizes, etc.) means the continuous and/or iterative increase from a first value to a second value greater than the first value. Likewise, the term "optimize" and conjugations thereof (e.g., optimization, optimized, optimizes, etc.) means the continuous and/or iterative maximization and/or minimization of one or more parameters, as will be understood from the context in which the terms above are used in the description.

Figure 1:
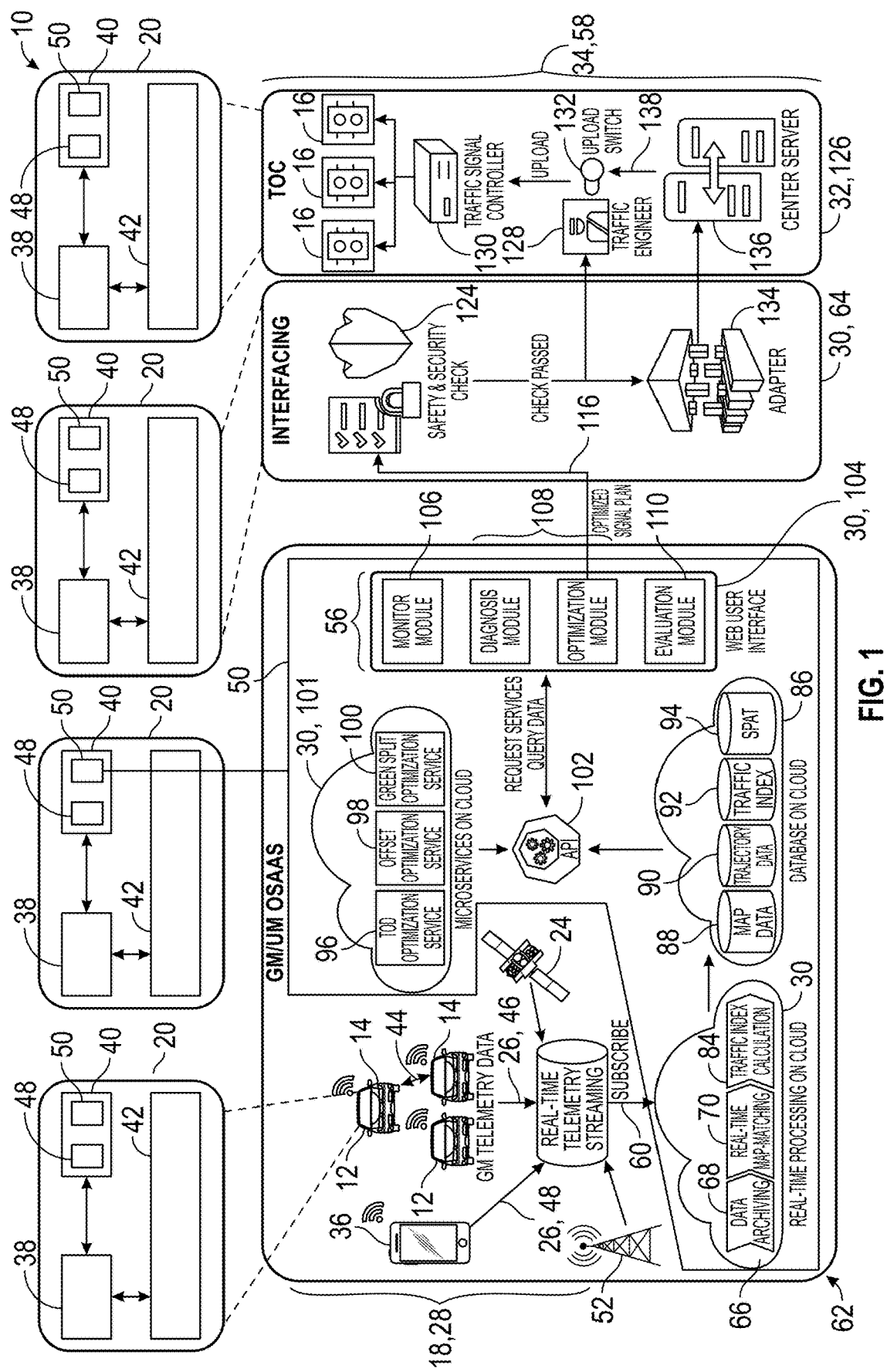
FIG. 1 is a schematic view of a system and method for optimizing traffic signal timing using vehicle telemetry data according to an aspect of the present disclosure.

Referring now to FIG. 1, a system 10 and method for optimizing traffic signal timing using vehicle 12 telemetry data is shown. The system 10 and method described herein enables traffic state estimation and traffic signal 16 control based on trajectory data of wirelessly connected devices (WCD) 12, such as connected vehicles (CVs) 14. Although the illustrated embodiment in FIG. 1 is described primarily as it would be implemented with CVs 14 that utilize a global navigation satellite system (GNSS) for position information, it will be appreciated as the description proceeds that the system and methods discussed herein may be used with other WCDs 12 such as handheld wireless devices having GNSS receivers along with cellular and/or short-range wireless communication (SRWC) capabilities.

The system 10 and method described herein use time-location (TL) data received from a WCD 12. The TL data is data indicative of the global position of the connected device at one or more particular points in time. In at least some embodiments, the TL data may be one or more trackpoints comprising global position coordinates of the device, along with time data representing when the device was at the location represented by the trackpoint(s). In the embodiments discussed herein, a GNSS receiver incorporated into the WCD 12 is used to generate the global position data (i.e., GNSS information or data) that is used for the TL data, although other techniques for position determination may be used instead of or in addition to the use of GNSS information. The trackpoints or other global position data that is provided by each individual WCD 12 may be generated by that device from received GNSS radio signals using whatever GNSS receiver is included in the device, and may be provided in NMEA format, GPX format, or other such formats. The TL data also includes time data indicative of when the WCD 12 was at the position indicated by the global position data (e.g., as a UTC time included in a NMEA standard output format, or the like), or the time data may be provided in other ways or from other sources; for example, by a clock on the WCD 12 or by a network over which the global position data is transmitted from the device to a central facility where the traffic state estimation is carried out.

For any particular WCD 12, the TL data may be provided as a set of telemetric data or other global position data points along with time data that enables determination of the time, velocity, position and other such trajectory-related data defining state information or characteristics of the WCD 12 at some or all of a set of locations. When at least some of the data points in the series includes different positions for the WCD 12 or CV 14, then that series of TL data is representative of a trajectory of the WCD 12 or CV 14. The different trackpoints may be sent individually from the WCD 12 as they are determined and then combined together at the central facility to determine the trajectory of the WCD 12, or the trackpoints may be sent together as a track or other collection of TL data points. The TL data may include, or be sent with, a device identification (ID) so that different tracks or trackpoints or different pieces or groups of TL data may be associated with each other to determine the device trajectory. Techniques for doing this will be known to those skilled in the art.

Given that the TL data includes time data, the trajectory of a device may include time information indicating when the device was at the different points making up that trajectory. Thus, the trajectory may be used to determine or predict certain events and/or attributes associated with certain events, such as a projected arrival time at a particular intersection, the departure time from the intersection, as well as whether the vehicle or other device was stopped at the intersection or able to proceed through the intersection without a stop. As will be described below, those different types of trajectories may be used to determine an estimated traffic state at the intersection.

In many embodiments, the GNSS-based trajectory data from CV 14 or other WCD 12 is used at low penetration rates to estimate traffic states, which can be a useful input to many signal optimization algorithms. Additionally, because not all vehicles or devices approaching a given intersection are CVs 14 or WCDs 12, respectively, an approximate quantity of vehicles or devices approaching the intersection may be calculated based on estimates of proportions of CVs 14 or WCDs 12 per variable penetration rates of vehicles and/or devices in the population at large. In several aspects, the penetration rate is a proportion of WCDs 12 and/or CVs 14 relative to the entire population of devices and/or vehicles at or approaching an intersection. The total traffic volumes at the intersection may be estimated by dividing the number of observed vehicles by the penetration rate if known. Therefore, traffic volumes and penetration rate can be estimated at the same time.

Penetration rate and volume estimation takes the calculated traffic indices as input and is formulated according to a probabilistic time-space model established from a queueing model. In some instances, vehicle arrivals at signalized intersections can be modeled as a time-dependent Poisson process. The downstream arrival is determined by the upstream departure, and thus it can account for coordination among intersections. In several aspects, the estimation is a moment estimation given multiple observed trajectories or other information from CVs 14 and/or WCDs 12 approaching the intersection. Both the penetration rate and traffic volumes are estimated by matching delay performance between the probabilistic time-space model and observed WCD 12 and/or CV 14 trajectories. As used herein, the trajectory of a WCD 12 refers to the track or path, actual or projected, of the WCD 12. This trajectory may also include a timestamp or other time data such as is typically included in NMEA-formatted messages. An expectation maximization (EM) procedure can be derived to aid in this estimation problem.

The system 10 operates in an environment that includes a communications system 18 that can be used to implement the system 10 and method disclosed herein. The communications system 18 generally includes one or more WCDs 12 which may be CVs 14. Each of the WCDs 12 and/or CVs 14 includes a control module 20 and a global navigation satellite system (GNSS) module that communicates with a constellation of GNSS satellites 24 to determine positions of the WCDs 12 and/or CVs 14. The WCDs 12 and/or CVs 14 also communicate via one or more wireless carrier systems 26. The system 10 also includes a land communications network 28 that may receive signals from the wireless carrier systems 26 and also provide a means of communication between a remote processing facility 30, a municipal facility 32, and a traffic control system 34 including the traffic signal 16. In several aspects, each of the remote processing facility 30, municipal facility 32, and traffic control system 34 includes one or more control modules 20.

The control modules 20 are non-generalized computer-based electronic control systems having one or more servers or computers that include a preprogrammed digital computer or processor 38 and non-transitory computer readable medium or memory 40. The processors 38 can be any type of device capable of processing electronic instructions including microprocessors, microcontrollers, host processors, controllers, vehicle communication processors, and application specific integrated circuits (ASICs). The processors 38 may execute various types of digitally-stored instructions, such as software or firmware programs stored in the memory 40, which enable the facility to provide a wide variety of services. The memory 40 is used to store data such as control logic, software applications, instructions, computer code, data, lookup tables, and the like.

For instance, the processors 38 at the remote processing facility 30 may be configured to execute programs or process data to carry out at least a part of the system 10 and method discussed herein. In one embodiment, the process can execute an application 48 (e.g., computer program) that causes the processor 38 to perform one or more of the method steps on the GNSS information or other TL data that is received from the one or more CVs 14, mobile devices 36, and/or other WCDs 12. The memory 40 at remote processing facility 30 or municipal facility 32 can include powered temporary memory 40 and/or any suitable non-transitory, computer-readable medium such as different types of RAM (random-access memory, including various types of dynamic RAM (DRAM) and static RAM (SRAM)), ROM (read-only memory), solid-state drives (SSDs) (including other solid-state storage such as solid state hybrid drives (SSHDs)), hard disk drives (HDDs), magnetic or optical disc drives, or other suitable memory that stores some or all of the software needed to carry out the various external device functions discussed herein. A "non-transitory" computer readable medium or memory 40 excludes wireless, optical, or other communication links that transport electrical or other signals. A non-transitory computer readable medium or memory 40 includes media where data can be permanently stored and media where data can be stored and later overwritten, such as any type of program code, including source code, object code, and executable code.

The processor 38 is configured to execute the code or instructions. In some examples, the control module 20, or a separate control module 20 may be a dedicated wireless or Wi-Fi controller. Input/output (I/O) ports 42 of the control modules 20 are configured to communicate through wired or wireless means such as the communications network 26 including, but not limited to the wireless carrier systems 26, land communications network 28, vehicle-to-vehicle (V2V) communications network 44, and/or vehicle-to-infrastructure (V2I) communications network 46 using cellular communications, Wi-Fi protocols under IEEE 802.11x, Bluetooth communications protocols, radio frequency (RF) protocols, or the like.

In several aspects, the control modules 20 include one or more applications 48. An application 48 is a software program configured to perform specific functions or sets of functions. The application 48 may include one or more computer programs, software components, sets of instructions, procedures, functions, objects, classes, instances, related data, or a portion thereof adapted for implementation in a suitable computer readable program code. The applications 48 may be stored within the memory 40 or in an additional or separate memory 40. Examples of the applications 48 include audio or video streaming services, audio or visual processing services, a traffic signal optimization application 50, and the like.

V2I communications include communications that can be carried out between vehicles and remote networks such as the remote processing facility 30 and/or municipal facility 32. Such communications systems 18 may be one example that can carry out V2I communications. However, it should be understood that the system 10 and method disclosed herein may be used with any number of different systems and is not specifically limited to the operating environment depicted and described. Further, the architecture, construction, setup, and operation of the system 10 and components thereof are generally known in the art. Thus, the following paragraphs provide a brief overview of one such communications system 10. However, other systems not specifically shown in the figures could employ the disclosed method without departing from the scope or intent of the present disclosure.

Wireless carrier systems 26 may be any suitable cellular telephone system. The wireless carrier system 26 is shown as including a cellular tower 52, however the wireless carrier system 26 may include additional cellular towers 52 as well as one or more of the following components (e.g., depending on the cellular technology): base transceiver stations, mobile switching centers, base station controllers, evolved nodes (e.g., eNodeBs), mobility management entities (MMEs), serving and PGN gateways, etc., as well as any other networking components required to connect the wireless carrier system 26 with the land communications network 28, or to connect the wireless carrier system 26 with user equipment (UEs, e.g., which include telematics equipment in the CVs 14). The wireless carrier system 26 can implement any suitable communications technology including, for example, GSM/GPRS technology, CDMA or CDMA2000 technology, LTE technology, or the like. In general, wireless carrier systems 26 and components thereof, as well as interactions therebetween are generally known in the art.

Apart from utilizing the wireless carrier system 26, a different wireless carrier system 26 in the form of a satellite communications system 24 can be used to provide unidirectional or bi-directional communication with the CVs 14. Communication with the CVs 14 may be accomplished using one or more communications satellites (not specifically shown) and an uplink transmitting station (not specifically shown). Uni-directional communication can be for example, satellite radio services, wherein programming content (e.g., news, music) is received by the uplink transmitting station, packaged for upload, and then sent to the satellite, which broadcasts the programming to subscribers. Bi-directional communication can be, for example, satellite telephony services using the one or more communication satellites to relay telephone communications between the CVs 14 and the uplink transmitting station. If used, this satellite telephony can be utilized either in addition to or in lieu of wireless carrier system 26.

The land communications network 28 may be a conventional land-based telecommunications network 28 that is connected to one or more landline telephones and connects wireless carrier systems 26 to the remote processing facility 30. For example, land communications network 28 may include a public switched telephone network (PSTN) such as that used to provide hardwired telephony, packet-switched data communications, and the Internet infrastructure. One or more segments of land communications network 28 could be implemented through a standard wired network, a fiber or other optical network, a cable network, power lines, other wireless networks such as wireless local area networks (WLANs), or networks providing broadband wireless access (BWA), or any combination thereof.

The remote processing facility 30 may include various components and may include a wired or wireless local area network. The remote processing facility 30 may include a traffic diagnostic system 56, which can include numerous computers, servers, databases, and other computing devices. Generally, the remote processing facility 30 may receive and transmit data via a modem connected to land communications network 28.

A database at the remote processing facility 30 (e.g., at traffic diagnostic system 56) can store CV 14 information, trajectory data, GNSS information and other TL data, and any other data pertaining to WCDs 12. Data transmissions may also be conducted by wireless systems, such as IEEE 802.11x, GPRS, and the like. In one embodiment, the traffic diagnostic system 56 and/or remote processing facility 30 may be used to implement at least part of the method disclosed herein. In such a case, the traffic diagnostic system 56 may receive the TL and other data from CVs 14, mobile devices 36, and/or other WCDs 12. The remote processing facility 30 may then process this information and/or use the data to estimate traffic states, such as through generating a traffic state estimation value. As discussed in more detail below, any one or more of the methods below may be used to generate a traffic estimation value and/or other traffic diagnostic or predictive information. These estimated traffic states (e.g., the traffic state estimation value) and/or other traffic information may then be sent to the municipal facility 32 and traffic control system 34 via land communications network 28, wireless carrier system 26, or the like. In other embodiments, the remote processing facility 30 and/or traffic diagnostic system 56 may generate additional data based at least in part of the traffic state estimation value and/or TL data (e.g., trajectory data). This additional data may be sent to municipal facility 32 and/or traffic control system 34 as well.

The municipal facility 32 includes traffic signaling control system 58, which may include various computers, databases, servers, and other computing devices. The traffic signaling control system 58 may be used for controlling traffic signaling devices, such as traffic signals 16, or may be used for processing traffic-related data, including estimated traffic states or indices (e.g., the traffic state estimation value). In one embodiment, traffic signaling control system 58 can receive data from remote processing facility 30, such as estimated traffic states, and then, may generate traffic control data that can be sent to traffic signals 16 or other traffic signaling devices such as pedestrian cross-walk lights and lane direction and closure signals.

Current traffic signaling control systems 58 may receive traffic information from one or more traffic sensors, such as inductance loop detectors and/or video detectors, or from other such roadside equipment (RSE) that may be located at or near intersections. Municipal facilities 32 and/or traffic signaling systems 56 may receive information from CVs 14, mobile devices 36, and/or other WCDs 12 via RSE and the land communications network 28. However, current traffic signaling control systems 58 are infrequently updated. That is, while under the current regime, traffic signals 16 are occasionally retimed, the retiming typically occurs, on average, only about once every three to five years. Accordingly, the granularity of current traffic signal 16 retiming efforts does not account for changes in traffic states through intersections that may correspond to time-of-day, construction, crashes, or any of a wide variety of possible causes of traffic state change.

By contrast, the system 10 and method of the present disclosure utilizes the TL data received from a WCD 12, as well as telemetric data from WCDs 12 and/or CVs 14 to retime traffic signals 16 at intersections in a timely fashion. More specifically, the municipal facility 32 and/or traffic signaling control system 58 receives information from CVs 14, mobile devices 36, and/or other WCDs 12 via the wireless carrier system 26, and land communications network 28. In such embodiments, the municipal facility 32 and/or traffic signaling control system 58 may carry out at most of the method described herein, while the WCD 12 and/or CV 14 generate and send state information to the municipal facility 32 and/or traffic signaling control system 58.

In some embodiments, the traffic diagnostic system 56 and the traffic signaling control system 58 may be located at the same physical facility (e.g., remote processing facility 30 or municipal facility 32) and/or may be carried out utilizing the same set of hardware components, such as a group of servers or computers each including at least one control module 20 and subcomponents thereof as previously described.

In several aspects, the system 10 may be separated into several distinct parts carried out in or on different hardware and in at least some different locations. A first portion 62 of the system 10 defines the traffic signal optimization application 50, while a second portion 64 defines an interface between the first portion 62 and the traffic control system 34. The first portion 62 includes one or more of the WCDs 12 and CVs 14, each generating real-time telemetry data 60 from onboard sensors and receivers, including raw real-time telemetry relating to WCD 12 and/or CV 14 trip GNSS coordinates. The real-time telemetry data 60 is processed in a first cloud computing system 66. The first cloud-computing system 66 may include a control module 20, or may be an application 48 operating within computer hardware remotely located relative to the WCDs 12 and/or CVs 14. The first cloud-computing system 66 performs a variety of data pre-processing and aggregation procedures on the raw real-time telemetry, and generates a performance evaluation including direct measurements 67 based on the raw real-time telemetry.

Figure 2A:
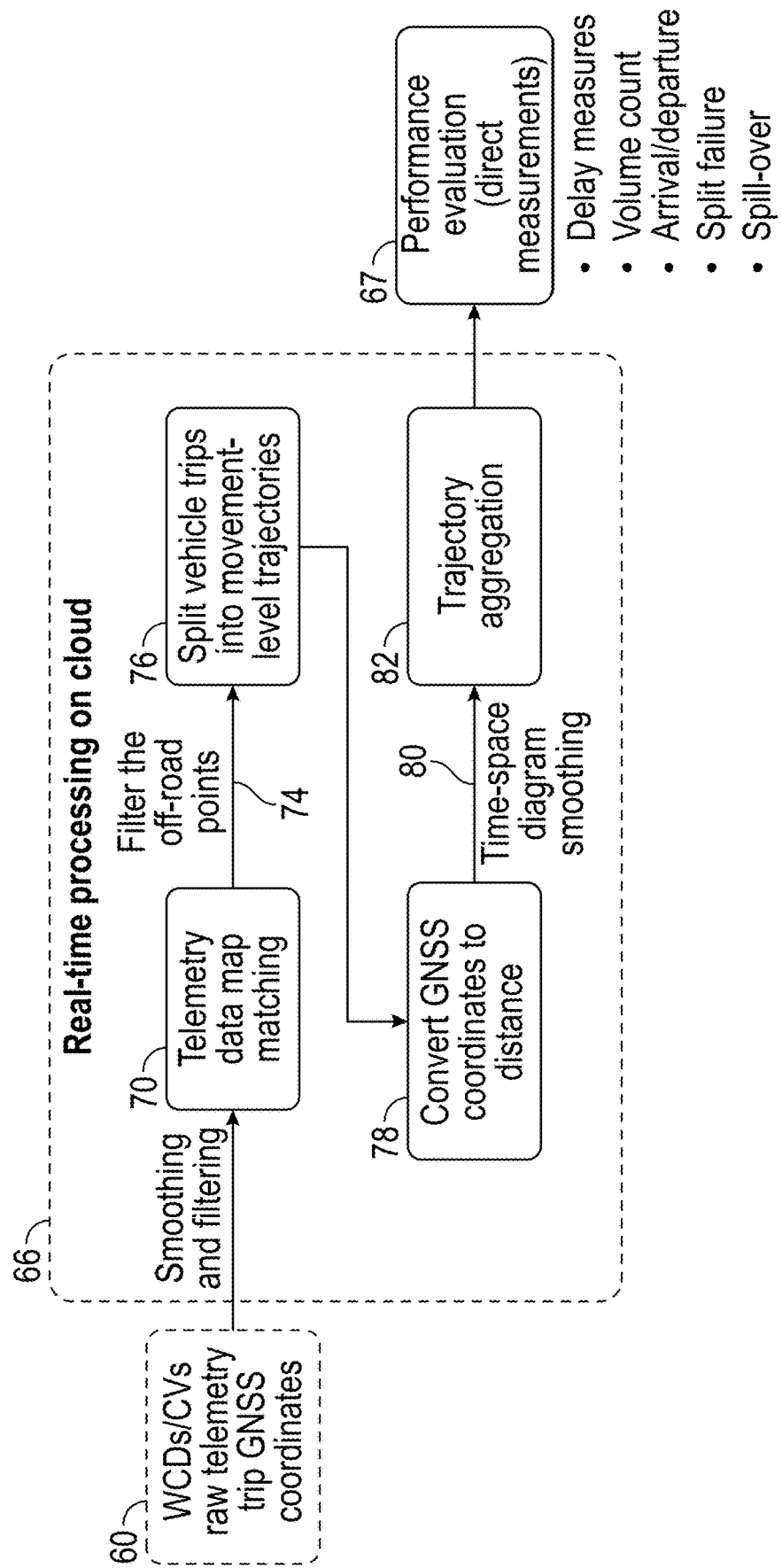
FIG. 2A is a flowchart depicting a first portion of the system and method for optimizing traffic signal timing using vehicle telemetry data of FIG. 1 according to an aspect of the present disclosure.

Referring now to FIG. 2A and with continuing reference to FIG. 1, the pre-processing and aggregation procedures are shown in additional detail. Specifically, the first cloud-computing system 66 smooths and filters the raw real-time telemetry, and archives 68 the real-time telemetry data 60. Next, the smoothed and filtered real-time telemetry is map-matched 70 to physical locations in the real world. Off-road points 74 are filtered out of the real-time telemetry data 60 once the mapping process 70 is complete. WCD 12 and/or CV 14 trips are then split into movement-level trajectories 76, and the GNSS coordinates are converted 78 to distance measurements. A time-space smoothing algorithm 80 is then applied to the distance measurements and trajectories of all of the WCDs 12 and/or CVs 14 contributing real-time telemetry are aggregated 82 to generate the direct measurements 67 of system 10 performance. In several aspects, the direct measurements 67 of system 10 performance include information about delay measurements, quantity of stops, traffic volume and/or state counts, arrival and departure times, split failures, and spill-over data, and the like. These performance metrics are obtained from the WCDs 12 and CVs 14 without the need for RSE at the intersections. That is, the direct measurements 67 are entirely separate from any data generated by inductance loop detectors and/or video detectors, or from any other such RSE that may be located at or near intersections.

The cloud-computing system 66 performs a traffic index calculation 84. In several aspects, the traffic index calculation 84 is continuously performed on the real-time trajectories from the real-time telemetry data 60 from the WCDs 12 and/or CVs 14, and stored in a cloud-based database 86. The cloud-based database 86 is a repository of data stored in memory 40 of one or more control modules 20 of the first cloud computing system 66. The cloud-based database 86 includes long-term or historical map data 88, trajectory data 90, a traffic index 92, and signal phase and timing (SPaT) 94 information. The map data 88 includes mapped locations of all traffic signals 16 to which the system 10 and method of the present disclosure applies. The trajectory data 90 includes long-term or historical trajectory information previously reported by one or more WCDs 12 and/or CVs 14 at all mapped intersections on which the system 10 and method of the present disclosure operate. Likewise, the traffic index 92 includes long-term and/or historical traffic position, volume, delay, and stoppage information at each of the mapped intersections, as reported by the one or more WCDs 12 and/or CVs 14. In several aspects, the direct measurements 67 are collected and stored in the traffic index 92. Additionally, the SpaT 94 information stored in the cloud-based database 86 includes traffic signal 16 data such as cycle time, time-of-day (TOD) information, green split information, coordination and timing information relating multiple traffic signals 16 to one another, and the like.

Figure 2B:
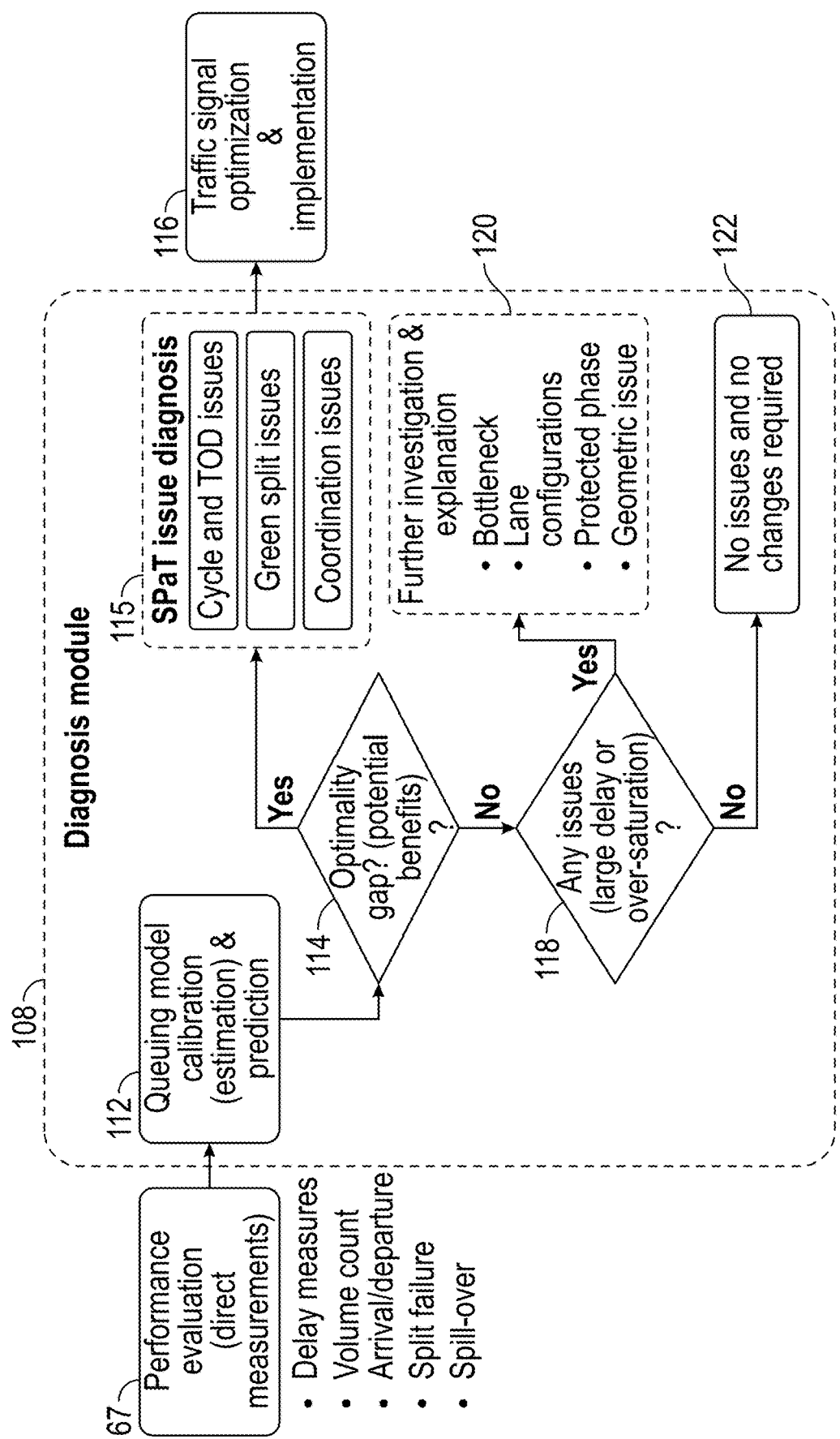
FIG. 2B is a flowchart depicting a second portion of the system and method for optimizing traffic signal timing using vehicle telemetry data of FIG. 1 according to an aspect of the present disclosure.

Referring now to FIG. 1 and FIG. 2B and with continuing reference to FIG. 2A, the system 10 utilizes a cloud-based microservice module 101 to perform a series of microservices. The microservices include at least a cycle and TOD optimization service 96, an offset optimization service 98, and a green split optimization service 100. The cycle and TOD optimization service 96 is used to adjust traffic signal 16 cycle timing based on known traffic flow variations over time. Cycle time is the length of time for one iteration through all movements of a traffic signal 16. For instance, the time between the green start of a northbound movement until the subsequent green start of the northbound movement defines a single cycle and the corresponding amount of time for that cycle is the cycle time. In further examples, in many locations during "rush hour" between approximately six o'clock in the morning and approximately ten o'clock in the morning traffic flow volumes may be significantly higher than during the period between eleven o'clock in the morning and approximately three o'clock in the afternoon. Accordingly, the timing of certain traffic signals 16 on high-volume traffic routes may be timed to allow greater volume in a particular direction during rush hour, while in lower traffic volume portions of the day, the traffic signals 16 may be more evenly timed in all directions.

Traffic signal 16 offset is the difference in time from a reference point in a traffic signal 16 cycle to the same point in the cycle at a downstream intersection. The reference point is typically determined to be the beginning of a green signal of a major street or street of coordination. In several aspects, the offset optimization service 98 optimizes the timing of traffic signal 16 offsets so that, for example, a maximum volume of traffic throughput and minimization of total delays and quantities of stops can be achieved for multiple traffic signals 16 in a series and along one or more roads.

A green split is a proportion of green time among various traffic signal 16 operational phases according to a critical volume of each operational phase. Accordingly, the green split optimization service 100 ascertains green time for each traffic signal 16 in the system 10 to maximize traffic volume throughput and minimization of total delays and quantities of stops. Outputs from each of the cycle and TOD optimization service 96, offset optimization service 98, and green split optimization service 100, and from the cloud-based database 86 are transmitted to and received by an application programming interface (API) 102.

The API 102 provides an interface between multiple different applications 48 and/or control modules 20 that allows the applications 48 to communicate with one another. In several aspects, the API 102 may be queried by and/or otherwise send data to a web user interface 104. The web user interface 104 is a portal through which traffic optimization services may be requested or traffic data may be queried. The web user interface 104 includes multiple sub-modules such as a monitor module 106, the diagnosis and optimization module 108, evaluation modules 110, and the like. The monitor module 106 continuously and in real-time tracks traffic flow and performance (i.e., flow volume, speed, delays, and the like) as estimated from the WCDs 12 and/or CVs 14 of the system 10.

The diagnosis and optimization module 108, the details of which are shown in detail in FIG. 2B, receives the traffic index 92 information, including information about delay measurements, quantities of stops, traffic volume counts, arrival and departure times, split failures, and spill-over data, and the like. The direct measurements 67 of system 10 performance are put through a stochastic traffic flow model called a probabilistic space-time model (PTS) model 112. The PTS model 112 assumes a binary arrival and departure for each WCD 12 and/or CV 14 in the system 10 for each time step. That means that both the arrival and departure are either zero or some Au for each time step, where Au defines a unit arrival or departure, or more generally, unit flow per time step. The PTS model 112 is used to estimate the overall traffic state and predict an overall average traffic state given partially observed vehicle 12 trajectories even under relatively low penetration rates, including circumstances where WCDs 12 and/or CVs 14 make up less than ten percent of WCDs 12 and/or CVs 14 passing through a given intersection. In several aspects, the PTS model predicts delays, quantities of stops, traffic volume counts, arrival and departure times, split failures, and spill-over data, and the like. The diagnosis and optimization module 108 finds the traffic performance optimality gap 114 with respect to different traffic parameters, which indicate different traffic signal 16 re-timing opportunities.

Diagnosis and optimization algorithms update traffic signal 16 parameters for intersections that show potential for improvement. The diagnosis algorithms determine the optimality gap 114 for traffic signals 16 at a given intersection through determining hourly costs including delays, stops, and remote queueing data from each of the WCDs 12 and/or CVs 14 that pass through the intersection. These data are collected over a series of time steps which may be of any length, without departing from the scope or intent of the present disclosure. According to the optimality gaps 114, the optimization algorithms update traffic signal 16 parameters for intersections that show potential for improvement. Since, the diagnosis and optimization module 108 utilizes a pre-defined traffic signal 16 timing calibration and the direct measurements 67 from the WCDs 12 and/or CVs 14 as inputs, the diagnosis and optimization module 108 can easily identify optimality gaps 114 through known methods such as gradient-based or line search methodologies. For traffic signal 16 timing parameters of isolated intersections, such as cycle lengths and green splits, gradient-based methods are used since they usually do not require major changes. In such situations, the sign of the gradient indicates the direction that could improve system 10 performance, while the magnitude of the gradient quantifies potential benefits. The output diagnostic results may address specific issues, such as green split imbalances, insufficient cycle length, and the like. The diagnostic results are then used directly to generate new traffic signal 16 timing plans which move a certain step size in the gradient direction. By contrast, for coordinated intersections such as a series of signals along a corridor, a pair-wise coordination diagnosis method is used to identify the coordination opportunity between every adjacent intersections. For corridors with further coordination opportunities, a coordinate-descent algorithm may be used to optimize the offset. Upon determining that an optimality gap 114 exists, the diagnosis and optimization module 108 calculates possible benefits and applies corrections to traffic signal 16 timing in accordance with SPAT diagnosis 115 results. In several aspects, the corrections may address cycle time and TOD issues, green split issues, coordination issues between multiple traffic signals 16, or the like. An optimized signal plan 116 is generated as an output of the diagnosis and optimization module 108, and sent to the interface 64. However, upon determining that there is no optimality gap 114, the diagnosis and optimization module 108 determines whether issues 118 such as large delays or oversaturation of the data exist.

Upon determining that large delays or oversaturation issues 118 exist, further investigation 120 is performed. The additional investigation attempts to verify the source or cause of traffic delays, such as bottlenecks, lane configurations, protected phase, or geometric issues at or near the intersection. Such sources or causes of traffic delays may also include construction or other such road constriction or traffic constriction delays, or the like. By contrast, upon determining that no issues exist, then the diagnosis and optimization module 108 determines that no calibration changes are required and generates no output at block 122.

Once the optimized signal plan 116 is received by the interface 64, a safety and security check 124 is performed. The safety and security check 124 verifies that the data being received by and/or transmitted from the interface 64 is from a recognized and trusted source. Moreover, the data is checked for accuracy and consistency. For example, some physical limitations of wireless infrastructure may cause wireless signal quality degradation and/or packet loss. Likewise, the safety and security check 124 validates the optimized signal plan 116 against safety constraints of the signal plan, such as minimum green times, conflict phase detection, and the like. Accordingly, data having poor signal quality, high degradation, or significant packet loss may be flagged as being unsafe to use in traffic signal 16 retiming processes. Upon passing the safety and security check 124, the optimized signal plan 116 is sent to a traffic operations center (TOC) 126.

The TOC 126 is a municipal facility 32 housing the traffic control system 34, and managed by one or more traffic engineers 128. The traffic engineer(s) 128 are human operators that manage and may manipulate a traffic signal controller 130 which can be used to selectively upload new traffic signal 16 timing calibrations. In several aspects, traffic engineer 128 manages an upload switch 132 that selectively allows the upload of a new traffic signal 16 timing calibration. It should be appreciated that the upload switch 132 may be used to prevent the upload of any new traffic signal 16 timing calibration and is not limited only to calibrations based on the optimized signal plan 16. Accordingly, should the traffic engineer(s) 128 wish to stop the entire traffic control system 34 they may do so via the upload switch 132. Further, it should be appreciated that the system 10 may operate autonomously or automatically and without a traffic engineer 128. In such examples, the system 10 automatically uploads the optimized signal plan 116 to the traffic signal controller 130, and from there to the various traffic signals 16 in the traffic control system 34. The optimized signal plan 116 is passed through an adapter 134 within the interface 64 to format the optimized signal plan 116 into data readable and executable by a TOC server 136. The TOC server 136 is a control module 20 having components substantially similar to those described herein in relation to other control modules 20 of the system 10. The TOC server 136 generates control output 138 that defines an updated or otherwise optimized signal calibration that, when the upload switch 132 allows, is used to alter traffic signal 16 timing.

In several aspects, the optimized signal plan 116 is generated continuously in an independent closed-loop iterative manner based on continuous monitoring and optimization of signalized intersections through data acquired from the WCDs 12 and CVs 14. The system 10 operates independently in a self-sufficient operation requiring no sensing data or fieldwork from any government agency, municipality, or the like. The closed-loop nature of the system 10 allows it to run from beginning-to-end to implement the retiming of traffic signals 16. The system 10 runs in an iterative manner, responsive to timing through continuous execution of the system and method disclosed herein. In some examples, the system 10 may operate in real-time, periodically during predefined intervals such as every minute, every five minutes, every 10 minutes, or the like. In further examples, the system 10 may operate periodically over longer time intervals or time steps, such as on a daily, weekly, or monthly basis.

A system 10 and method optimizing traffic signal timing using vehicle telemetry of the present disclosure offers several advantages. These include the ability to improve the ability of traffic signals 16, and traffic management systems to prevent deadlock and gridlock situations without increasing complexity and without requiring standardization, while improving traffic signal 16 functionality, intersection throughput and speed while maintaining or improving vehicle traffic flow, while using preexisting hardware.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A system for optimizing traffic signal timing using telemetry data, the system comprising:
   one or more wirelessly connected devices (WCDs);
   one or more traffic operations centers (TOCs) controlling one or more traffic signals;
   one or more control modules, each of the one or more control modules having a memory, a processor, and one or more input/output (I/O) ports, the memory storing programmatic control logic, the processor executing the programmatic control logic, and the I/O ports in communication with the one or more wirelessly connected devices and the TOCs, wherein the programmatic control logic operates continuously in a closed loop comprising:
   a first control logic for continuously receiving real-time raw telemetry data from the one or more WCDs;
   a second control logic for performing real-time processing of the real-time raw telemetry data to match the real-time raw telemetry data to physical locations;
   a third control logic for aggregating processed real-time raw telemetry data and determining trajectories of the WCDs;
   a fourth control logic for selectively performing one or more of cycle and time-of-day (TOD), offset, and green split optimization microservices;
   a fifth control logic for receiving the trajectories of the WCDs and for receiving outputs of the cycle and TOD, offset, and green split optimization microservices within an API;
   a sixth control logic for generating an optimized signal plan from the trajectories of the WCDs and outputs of the cycle and TOD, offset, and green split optimization microservices, and for determining an optimality gap, wherein upon determining that an optimality gap is present, the sixth control logic generates a signal phase and timing (SPaT) diagnosis including: traffic signal cycle and time of day issue recognition, green split issue recognition, and traffic signal coordination issue recognition, and generating the optimized signal plan based on the optimality gap; and upon determining that no optimality gap is present, the sixth control logic determines that one or more issues including: large delays or data oversaturation exist, conducts additional investigation to verify a source of traffic delays including: bottlenecks, lane configurations, protected phase, geometric issues at or near an intersection, and road construction; and selectively does not generate the optimized signal plan when the optimality gap is not present and the one or more issues do not exist;

a seventh control logic for verifying the optimized signal plan; and an eighth control logic for receiving the optimized signal plan within the one or more TOCs and selectively uploading the optimized signal plan to one or more traffic signals at signalized intersections, wherein the optimized signal plan increases throughput of traffic at the signalized intersections from a first level to a second level greater than the first level by decreasing total delays and quantities of stops from a first quantity to a second quantity less than the first quantity, and wherein the system automatically generates new traffic signal timing plans, wherein the traffic comprises: all vehicles and devices at, approaching, or within the signalized intersections.

2. The system of claim 1, wherein the second control logic further comprises:
control logic that matches the real-time raw telemetry data to map locations;
control logic that splits individual WCD telemetry into movement-level trajectories for each WCD; and
control logic that converts global navigation satellite system (GNSS) coordinates from the real-time raw telemetry data to distance measurements.

3. The system of claim 2 wherein the third control logic further comprises:
control logic that aggregates map locations, movement-level trajectories, and distance measurements into an aggregated trajectory; and
control logic that generates a traffic signal performance evaluation from directly measured real-time raw telemetry data and the aggregated trajectory.

4. The system of claim 3, wherein the control logic that generates a traffic signal performance evaluation further comprises:
control logic that evaluates traffic signal performance from factors comprising: delay measurements, volume counts, arrival and departure times, split failure, and spill over for WCDs at the traffic signals.

5. The system of claim 1, wherein the fourth control logic further comprises:
control logic that generates a cycle and TOD traffic signal timing plan that increases throughput by decreasing delays and quantities of stops for all devices from the first quantity to the second quantity less than the first quantity at the signalized intersection based on an overall traffic state of WCDs passing through the signalized intersection over time;
control logic that generates an offset traffic signal timing plan that increases throughput of devices from the first level to the second level at the one or more traffic signals; and
control logic that ascertains a green split time for each traffic signal in the system and optimizes green split timing for each of the traffic signals and increases throughput of all devices from the first level to the second level.

6. The system of claim 1 wherein the sixth control logic further comprises:
control logic for continuously applying a probabilistic space-time model established by a queueing model that estimates and predicts a current traffic state and future traffic states based on depending on future traffic signal parameters, wherein the WCDs make up only a portion of devices passing through the signalized intersections.

7. The system of claim 1, wherein the seventh control logic further comprises:
control logic for verifying the optimized signal plan by performing a safety and security check of the optimized signal plan, wherein the safety and security check ensures that the optimized signal plan is received from a recognized and trusted source, that wireless signal quality degradation and packet loss have not degraded the optimized signal plan, and that the optimized signal plan satisfies defined safety constraints.

8. The system of claim 1, wherein the eighth control logic further comprises:
control logic for receiving the optimized signal plan within a TOC server; and
control logic that automatically uploads the optimized signal plan to a traffic signal controller, wherein the traffic signal controller executes the optimized signal plan and causes one or more traffic signals to operate in accordance with traffic signal timing within the optimized signal plan.

9. The system of claim 8, wherein the eighth control logic further comprises:
control logic for presenting a traffic engineer, within the TOC, with the optimized signal plan, wherein the traffic engineer selectively inhibits the optimized signal plan from being uploaded to the traffic signal controller.

10. A method for optimizing traffic signal timing using telemetry data, the method comprising:
utilizing one or more wirelessly connected devices (WCDs);
controlling one or more traffic signals through one or more traffic operations centers (TOCs);
utilizing one or more control modules, each of the one or more control modules having a memory, a processor, and one or more input/output (I/O) ports, the memory storing programmatic control logic, the processor executing the programmatic control logic, and the I/O ports in communication with the one or more wirelessly connected devices and the TOCs, wherein the programmatic control logic operates continuously in a closed loop comprising:
continuously receiving real-time raw telemetry data from the one or more WCDs;
performing real-time processing of the real-time raw telemetry data to match the real-time raw telemetry data to physical locations;
aggregating processed real-time raw telemetry data and determining trajectories of the WCDs;
selectively performing one or more of cycle and time-of-day (TOD), offset, and green split optimization microservices;
receiving the trajectories of the WCDs and for receiving outputs of the cycle and TOD, offset, and green split optimization microservices within an API;

generating an optimized signal plan from the trajectories of the WCDs and outputs of the cycle and TOD, offset, and green split optimization microservices;
determining an optimality gap, and upon determining that an optimality gap is present,
generating a signal phase and timing (SPaT) diagnosis including: traffic signal cycle and time of day issue recognition, green split issue recognition, and traffic signal coordination issue recognition;
generating the optimized signal plan based on the optimality gap; and
upon determining an optimality gap is not present:
determining that one or more issues including large delays or data oversaturation exist;
conducting additional investigation to verify a source of traffic delays including: bottlenecks, lane configurations, protected phase, geometric issues at or near an intersection, and road construction; and
selectively not generating the optimized signal plan when the optimality gap is not present and the one or more issues do not exist;
verifying the optimized signal plan; and
receiving the optimized signal plan within the one or more TOCs and selectively uploading the optimized signal plan to one or more traffic signals, wherein the optimized signal plan increases throughput of traffic at the signalized intersections from a first level to a second level greater than the first level by decreasing total delays and quantities of stops from a first quantity to a second quantity less than the first quantity, and automatically generating new traffic signal timing plans.

11. The method of claim 10, further comprising:
matching the real-time raw telemetry data to map locations;
splitting individual WCD telemetry into movement-level trajectories for each WCD; and
converting global navigation satellite system (GNSS) coordinates from the real-time raw telemetry data to distance measurements.

12. The method of claim 11 further comprising:
aggregating map locations, movement-level trajectories, and distance measurements into an aggregated trajectory; and
generating a traffic signal performance evaluation from directly measured real-time raw telemetry data and the aggregated trajectory.

13. The method of claim 12, generating a traffic signal performance evaluation further comprises:
evaluating traffic signal performance from factors comprising: delay measurements, volume counts, arrival and departure times, split failure, and spill over for WCDs at the traffic signal.

14. The method of claim 10, further comprising:
generating a cycle and TOD traffic signal timing plan that increases throughput by decreasing delays and quantities of stops for all devices from the first quantity to the second quantity less than the first quantity at the signalized intersection based on an overall traffic state of WCDs passing through the signalized intersection over time;
generating an offset traffic signal timing plan that increases throughput of devices from the first level to the second level at the one or more traffic signals; and
ascertaining a green split time for each traffic signal and optimizes green split timing for each of the traffic signals and increases throughput of all devices from the first level to the second level.

15. The method of claim 10 further comprising:
continuously applying a probabilistic space-time model established by a queueing model that estimates and predicts a current traffic state and future traffic states based on depending on future traffic signal parameters, wherein the WCDs make up only a portion of devices passing through the signalized intersections.

16. The method of claim 10, further comprising:
verifying the optimized signal plan by performing a safety and security check of the optimized signal plan, wherein the safety and security check ensures that the optimized signal plan is received from a recognized and trusted source, that wireless signal quality degradation and packet loss have not degraded the optimized signal plan, and that the optimized signal plan satisfies defined safety constraints.

17. The method of claim 10, further comprising:
receiving the optimized signal plan within a TOC server; and
automatically uploading the optimized signal plan to a traffic signal controller, wherein the traffic signal controller executes the optimized signal plan and causes one or more traffic signals to operate in accordance with traffic signal timing within the optimized signal plan.

18. The method of claim 17, further comprising:
presenting a traffic engineer, within the TOC, with the optimized signal plan; and
selectively inhibiting, via the traffic engineer, the optimized signal plan from being uploaded to the traffic signal controller.

19. A method for optimizing traffic signal timing using telemetry data, the method comprising:
utilizing one or more wirelessly connected devices (WCDs);
controlling one or more traffic signals through one or more traffic operations centers (TOCs);
utilizing one or more control modules, each of the one or more control modules having a memory, a processor, and one or more input/output (I/O) ports, the memory storing programmatic control logic, the processor executing the programmatic control logic, and the I/O ports in communication with the one or more wirelessly connected devices and the TOCs, wherein the programmatic control logic operates continuously in a closed loop comprising:
continuously receiving real-time raw telemetry data from the one or more WCDs;
performing real-time processing of the real-time raw telemetry data by matching the real-time raw telemetry data to map real-time raw telemetry data to physical locations;
splitting individual WCD telemetry into movement-level trajectories for each WCD;
converting global navigation satellite system (GNSS) coordinates from the real-time raw telemetry data to distance measurements;
aggregating map locations, movement-level trajectories, and distance measurements into an aggregated trajectory;
generating a traffic signal performance evaluation from directly measured real-time raw telemetry data and the aggregated trajectory, and evaluating traffic signal performance from factors comprising: delay measurements, volume counts, arrival and departure times, split failure, and spill over for WCDs at the traffic signal;

selectively performing one or more of cycle and time-of-day (TOD), offset, and green split optimization microservices by generating a cycle and TOD traffic signal timing plan that increases throughput of WCDs from a first level to a second level greater than the first level at a signalized intersection based on a volume of WCDs passing through the signalized intersection over time;

generating a cycle and TOD traffic signal timing plan that increases throughput by decreasing delays and quantities of stops for all devices from a first quantity to a second quantity less than the first quantity at the signalized intersection based on an overall traffic state of WCDs passing through the signalized intersection over time;

generating an offset traffic signal timing plan that increases throughput of devices from the first level to the second level at the one or more traffic signals;

ascertaining a green split time for each traffic signal in the system and optimizes green split timing for each of the traffic signals and increasing throughput of WCDs from the first level to the second level;

continuously applying a probabilistic space-time model calibration and estimation, and predicting an overall average traffic state, wherein the WCDs make up only a portion of devices passing through an intersection;

receiving the trajectories of the WCDs, and receiving outputs of the cycle and TOD, offset, and green split optimization microservices within an API;

generating an optimized signal plan from the trajectories of the WCDs and outputs of the cycle and TOD, offset, and green split optimization microservices;

determining an optimality gap, wherein upon determining that an optimality gap is present, the programmatic control logic generates a signal phase and timing (SPaT) diagnosis including: traffic signal cycle and time of day issue recognition, green split issue recognition, and traffic signal coordination issue recognition, and generating the optimized signal plan based on the optimality gap; verifying the optimized signal plan by performing a safety and security check of the optimized signal plan, wherein the safety and security check ensures that the optimized signal plan is received from a recognized and trusted source;

receiving the optimized signal plan within a TOC server;

presenting a traffic engineer, within the TOC, with the optimized signal plan; and upon receiving confirmation from the traffic engineer, selectively uploading the optimized signal plan to a traffic signal controller, wherein the traffic signal controller executes the optimized signal plan and causes one or more traffic signals to operate in accordance with traffic signal timing within the optimized signal plan, wherein the optimized signal plan increases throughput of traffic at the signalized intersections from a first level to a second level greater than the first level by decreasing total delays and quantities of stops from a first quantity to a second quantity less than the first quantity, and wherein the method automatically generates new traffic signal timing plans.

\* \* \* \* \*